United States Patent
Timmermann

(10) Patent No.: US 9,688,128 B2
(45) Date of Patent: Jun. 27, 2017

(54) SEALING ARRANGEMENT FOR A MOTOR VEHICLE WINDOW PANE

(71) Applicant: SAINT-GOBAIN GLASS FRANCE, Courbevoie (FR)

(72) Inventor: Alwin Timmermann, Cologne (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 14/892,562

(22) PCT Filed: Jun. 16, 2014

(86) PCT No.: PCT/EP2014/062512
§ 371 (c)(1),
(2) Date: Nov. 19, 2015

(87) PCT Pub. No.: WO2014/206782
PCT Pub. Date: Dec. 31, 2014

(65) Prior Publication Data
US 2016/0101675 A1    Apr. 14, 2016

(30) Foreign Application Priority Data

Jun. 26, 2013    (EP) .................................... 13173768

(51) Int. Cl.
*B60J 10/00*    (2016.01)
*B62D 65/08*    (2006.01)
(Continued)

(52) U.S. Cl.
CPC ....... *B60J 10/0068* (2013.01); *B60J 10/0071* (2013.01); *B60J 10/0088* (2013.01);
(Continued)

(58) Field of Classification Search
CPC .................. B60J 10/0068; B60J 10/0071; B60J 10/0088; B60J 10/02; B60J 10/18;
(Continued)

(56) References Cited

U.S. PATENT DOCUMENTS 3,759,004 A    9/1973    Kent
3,783,568 A    1/1974    Adler et al.
(Continued)

FOREIGN PATENT DOCUMENTS

BE    EP 1361098 A1 * 11/2003 ........... B29C 70/763
CN    102470740 A    5/2012
(Continued)

OTHER PUBLICATIONS

International Search Report issued for International Application No. PCT/EP2014/056409 filed on Mar. 31, 2014 in the name of Saint-Gobain Glass France. Mail date: May 9, 2014 (English translation + German original).
(Continued)

*Primary Examiner* — Glenn Dayoan
*Assistant Examiner* — Paul Chenevert
(74) *Attorney, Agent, or Firm* — Steinfl + Bruno LLP

(57) ABSTRACT

A sealing arrangement for a vehicle window is described. The sealing arrangement includes a retaining rail having a latching channel that is formed by a guide rail and a spring leg having a latch hook, the retaining rail being affixed to a window pane. The sealing arrangement further includes a cover having a guide channel that is formed by a positioning stop and by a latching rail having a locking element. The guide rail is arranged in the guide channel and the latching rail is arranged in the latching channel.

22 Claims, 9 Drawing Sheets

Figure 1:
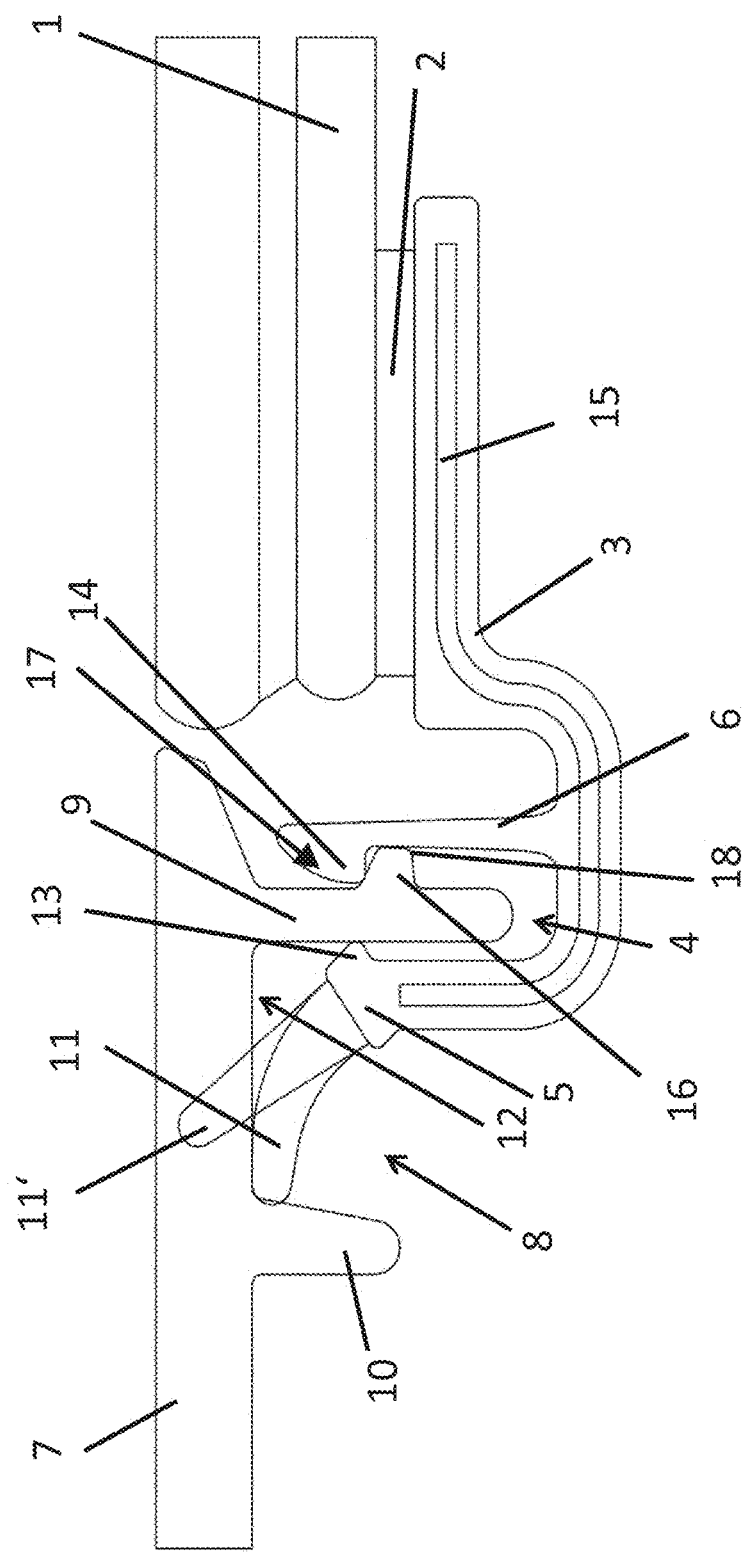

(51) Int. Cl.
  *B60J 10/02* (2006.01)
  *B62D 25/08* (2006.01)
  *B60J 10/18* (2016.01)
  *B60J 10/30* (2016.01)
  *B60J 10/34* (2016.01)
  *B60J 10/70* (2016.01)

(52) U.S. Cl.
  CPC .............. *B60J 10/02* (2013.01); *B60J 10/18* (2016.02); *B60J 10/30* (2016.02); *B60J 10/34* (2016.02); *B60J 10/70* (2016.02); *B62D 25/081* (2013.01)

(58) Field of Classification Search
  CPC ... B60J 10/30; B60J 10/32; B60J 10/33; B60J 10/34; B60J 10/45; B60J 10/70
  See application file for complete search history.

(56) References Cited

U.S. PATENT DOCUMENTS

| | | |
|---|---|---|
| 3,843,982 A | 10/1974 | Lane et al. |
| 4,240,227 A | 12/1980 | Hasler et al. |
| 4,523,783 A | 6/1985 | Yamada |
| 4,627,145 A | 12/1986 | Niemanns |
| 4,650,240 A | 3/1987 | Rinella |
| 4,823,511 A | 4/1989 | Herliczek et al. |
| 4,839,122 A | 6/1989 | Weaver |
| 4,840,001 A | 6/1989 | Kimisawa |
| 4,950,019 A | 8/1990 | Gross |
| 4,968,543 A | 11/1990 | Fujioka et al. |
| 4,994,315 A | 2/1991 | Schreiber et al. |
| 5,070,590 A | 12/1991 | Fujioka et al. |
| 5,139,846 A | 8/1992 | Herwegh et al. |
| 5,214,824 A | 6/1993 | Lesser et al. |
| 5,421,130 A | 6/1995 | Weber et al. |
| 5,567,239 A | 10/1996 | Ribic, Jr. |
| 5,806,257 A | 9/1998 | Cornils et al. |
| 5,840,401 A | 11/1998 | Baesecke |
| 5,882,766 A | 3/1999 | Baumann |
| 5,898,407 A | 4/1999 | Paulus et al. |
| 5,918,420 A | 7/1999 | Timmermann |
| 6,364,404 B1 | 4/2002 | De Paoli |
| 6,460,917 B2 | 10/2002 | De Paoli |
| 6,722,731 B2 | 4/2004 | Cornils et al. |
| 6,748,706 B2* | 6/2004 | Gaiser .................. B60R 13/07  52/204.53 |
| 6,769,700 B2 | 8/2004 | Ortmuller et al. |
| 6,794,882 B2 | 9/2004 | Jessup |
| 7,806,455 B2* | 10/2010 | Polke .................... B60J 10/18  296/93 |
| 7,870,958 B1* | 1/2011 | Gross .................... B65D 81/07  206/448 |
| 8,251,432 B2* | 8/2012 | Schaff .................... B60J 10/18  296/93 |
| 8,449,016 B2 | 5/2013 | Timmermann |
| 8,628,137 B2* | 1/2014 | Platt ........................ B60J 10/02  296/84.1 |
| 8,991,893 B2 | 3/2015 | Platt et al. |
| 9,056,544 B2* | 6/2015 | Kurata .................... B60J 10/02 |
| 9,168,879 B2 | 10/2015 | Timmermann et al. |
| 9,586,465 B2* | 3/2017 | Sanada .................... B60J 10/30 |
| 2001/0047058 A1 | 11/2001 | Johnson et al. |
| 2003/0006623 A1 | 1/2003 | Cornils et al. |
| 2003/0057660 A1 | 3/2003 | Ortmuller et al. |
| 2003/0066255 A1 | 4/2003 | Cripe |
| 2004/0035066 A1 | 2/2004 | Leconte |
| 2006/0165977 A1 | 7/2006 | Rehfeld et al. |
| 2006/0232093 A1 | 10/2006 | Boehm et al. |
| 2006/0266460 A1 | 11/2006 | Kreye |
| 2007/0246966 A1 | 10/2007 | Polke |
| 2008/0056505 A1 | 3/2008 | Rehfeld et al. |
| 2011/0018303 A1 | 1/2011 | Timmermann et al. |
| 2011/0115261 A1 | 5/2011 | Platt et al. |
| 2011/0181071 A1 | 7/2011 | Schaff et al. |
| 2011/0285177 A1 | 11/2011 | Flammer et al. |
| 2012/0126567 A1 | 5/2012 | Timmermann |
| 2012/0153659 A1 | 6/2012 | Senge |
| 2013/0224011 A1 | 8/2013 | Hashimoto |
| 2014/0327267 A1* | 11/2014 | Deussen .................. B60J 10/18  296/93 |
| 2014/0346803 A1 | 11/2014 | Timmermann et al. |
| 2016/0001645 A1* | 1/2016 | Ortmueller ............... B60J 10/18  403/288 |
| 2016/0075221 A1* | 3/2016 | Timmermann .......... B60J 10/30  49/480.1 |
| 2017/0028832 A1* | 2/2017 | Sekishiro ................. B60J 10/70 |

FOREIGN PATENT DOCUMENTS

| | | | |
|---|---|---|---|
| DE | 2649422 A1 * | 5/1977 | .............. B60J 10/15 |
| DE | 2825726 A1 * | 12/1979 | ............ E06B 7/231 |
| DE | 3643472 A | 12/1987 | |
| DE | 19961706 A1 | 7/2001 | |
| DE | 202008006986 U1 | 10/2009 | |
| DE | 102008050130 A1 | 4/2010 | |
| DE | 102009026369 A1 | 3/2011 | |
| DE | 102010056495 A1 * | 7/2012 | .............. B60J 10/18 |
| DE | 102012112674 A1 * | 6/2014 | .............. B60J 10/70 |
| EP | 1280675 A1 | 2/2003 | |
| EP | 1634753 A1 | 3/2006 | |
| EP | 1724141 A1 | 11/2006 | |
| FR | 2843227 A1 | 2/2004 | |
| FR | 2966091 A1 | 4/2012 | |
| FR | WO 2016128683 A1 * | 8/2016 | ................ B60J 1/02 |
| FR | 3036330 A1 * | 11/2016 | .............. B60J 1/004 |
| JP | H10151999 A | 6/1996 | |
| JP | 2002331838 A | 11/2002 | |
| JP | 2003532574 A | 11/2003 | |
| JP | 3699483 B2 | 9/2005 | |
| JP | 3776122 B2 | 5/2006 | |
| JP | 2011508700 A | 3/2011 | |
| JP | 2012510927 A | 5/2012 | |
| JP | 2013501672 A | 1/2013 | |
| JP | 2013086720 A | 5/2013 | |
| JP | 2015506877 A | 3/2015 | |
| JP | 2016516638 A | 6/2016 | |
| WO | 2004103754 A1 | 12/2004 | |
| WO | 2006/002891 A2 | 1/2006 | |
| WO | 2010037354 A | 4/2010 | |
| WO | 2013/120671 A1 | 8/2013 | |
| WO | 2014177329 A | 11/2014 | |
| WO | 2014/206782 A1 | 12/2014 | |

OTHER PUBLICATIONS

International Search Report issued for International Application No. PCT/EP2014/062512 filed on Jun. 16, 2014 in the name of Saint-Gobain Glass France. Mail date: Sep. 30, 2014 (English translation + German original).

Written Opinion issued for International Application No. PCT/EP2014/056409 filed on Mar. 31, 2014 in the name of Saint-Gobain Glass France. Mail date: May 9, 2014 (English translation + German original).

PCT Written Opinion for PCT Application PCT/EP2014/062512 filed on Jun. 16, 2014 in the name of Saint-Gobain Glass France. Mail date: Sep. 30, 2014. 16 pages. German original + English translation.

International Search Report for PCT Application PCT/EP2013/051179 filed on Jan. 23, 2013 in the name of Saint-Gobain Glass France Mail Date: Mar. 28, 2013. 5 pages. German Original + English Translation.

Written Opinion for PCT Application PCT/EP2013/051179 filed on Jan. 23, 2013 in the name of Saint-Gobain Glass France Mail Date: Mar. 28, 2013. German Original + English Translation.

Non-Final Office Action for U.S. Appl. No. 14/371,167, filed Jul. 8, 2014 on behalf of Alwin Timmermann. Mail Date: Feb. 23, 2015. 7 pages.

Notice of Allowance for U.S. Appl. No. 14/371,167, filed Jul. 8, 2014 on behalf of Alwin Timmermann. Mail Date: Jul. 6, 2015. 5 pages.

(56) References Cited

OTHER PUBLICATIONS

Non-Final Office Action for U.S. Appl. No. 14/888,323, filed Oct. 30, 2015 on behalf of Alwin Timmermann. Mail Date: Oct. 11, 2016. 16 pages.

* cited by examiner

A holding rail (3) is bonded to a pane (1) via an adhesive bond (2).

A guide rail (5) is arranged within a guide channel (8) of a cover (7).

The cover (7) is pressed with a latching rail (9) into a latching channel (4) beyond a latch hook (14) under tensioning of a spring element (11) between the guide rail (5) and a contact surface (12) on the underside of the cover (7), wherein an engagement sliding edge (18) of a locking element (16) of the latching rail (9) is guided along a convexly curved engagement surface (17) of the latch hook (14).

The cover (7) moves back under relaxation of the spring element (11) and the latch hook (14) is engaged on the locking element (16) of the latching rail (9).

Fig. 7

SEALING ARRANGEMENT FOR A MOTOR VEHICLE WINDOW PANE

CROSS REFERENCE TO RELATED APPLICATIONS

The present application is the U.S. national stage entry of International Patent Application No. PCT/EP2014/062512, filed internationally on Jun. 16, 2014 which, in turn, claims priority to European Patent Application No. 13173768.6, filed on Jun. 26, 2013.

The invention relates to a sealing arrangement for motor vehicle window panes, a method for its production, and its use.

Motor vehicles must, as a rule, be protected, in the region between the windshield and the engine body, against moisture, airflow generated by driving, and penetrating dirt. At the same time, the transition zone between the windshield and the metal car body must be sealed. In this transition region, water boxes made of plastic are also often used. Water boxes protect splash-water-sensitive components in the motor vehicle against moisture. The water box cover enables draining of the water accumulating on the windshield. However, the materials glass, various plastics, and metal have significantly different properties that make special considerations necessary during sealing. In order to enable secure sealing, particularly in the critical region of the water box, polymeric materials such as rubber gaskets are often used. A special water box seal that is arranged between the lower edge of the windshield and the water box cover often assumes this role. It must be stable, resistant, and also simple to install. The water box seal is usually produced by extrusion methods, the fixing on the components by suitable adhesives and adhesive systems.

DE 199 61 706 A1 discloses an arrangement for joining a fixedly installed windshield to a car body component, in particular to a water box. The arrangement comprises a shaped strip with a lip adhering to the vehicle window. The lip has, on its underside, means for joining to a component.

DE 10 2009 026 369 A1 discloses a sealing arrangement for motor vehicle window panes. It comprises a holding rail, a pane, and a cover connected via a connection point to a latching rail. The holding rail comprises a latching channel that is formed with a spring leg and support body. The cover is engaged with the latching rail in the latching channel and a spring element is arranged between the contact surface of the cover and the support body. Other sealing arrangements for motor vehicle window panes are known from FR 2 966 091 A1, DE 10 2008 050 130 A1, and WO 2013/120671 A1.

In order to to be able to obtain high leak-tightness and stability of the sealing arrangement, in particular perfectly fitting locking, very precise production is required. If the components produced deviate only slightly from the production specifications, very high forces are frequently required for locking the components. Depending on the deviation, even only limited sealing can result. High locking forces and production tolerances can also negatively affect the positioning accuracy of the sealing arrangement and make the installation process significantly more difficult.

The object of the invention consists in providing a sealing arrangement, in particular for motor vehicle window panes, that requires only low forces for durable and secure locking of the individual components.

The object of the present invention is accomplished according to independent claim 1. Preferred embodiments emerge from the subclaims.

A method according to the invention for producing an arrangement for sealing motor vehicle window panes as well as its use emerge from other independent claims.

The sealing arrangement for a vehicle window pane according to the invention comprises at least a holding rail with a latching channel. The latching channel is formed and delimited by a guide rail and a spring leg. The holding rail is affixed on a window pane. The fastening of the holding rail can be done via an adhesive or an adhesive tape. In an optional embodiment of the invention, the contact surface of the adhesive bond can be pretreated, for example, with a primer or a plasma treatment of the holding rail. The holding rail functions as a connecting piece between the pane and the car body component.

The arrangement according to the invention further comprises a cover, in particular a water box cover, with a guide channel, wherein the guide channel is formed by a latching rail and a positioning stop. The guide rail is arranged in the guide channel, while, simultaneously, the latching rail is engaged in the latching channel, and the spring leg is latch connected to the latching rail.

The arrangement according to the invention further comprises a latch hook arranged on the spring leg, with the latch hook having an at least section-wise convexly curved engagement guide surface. A locking element that has an engagement sliding edge is arranged on the latching rail. The latch hook with the engagement guide surface and the locking element with the engagement sliding edge are arranged such that, at the time of engagement, the engagement sliding edge is guided along the engagement guide surface and is engaged.

In an advantageous embodiment of the sealing arrangement according to the invention, the engagement guide surface of the latch hook is substantially convexly curved in the entire region over which the engagement sliding edge is guided over the latch hook at the time of engagement. Here, "substantially" means more than 75%, preferably more than 85%, and, in particular, more than 95%.

The arrangement according to the invention further comprises a spring element that is tensioned in the guide channel between a contact surface on the underside of the cover and the guide rail.

In an advantageous embodiment of the sealing arrangement according to the invention, the convexly curved engagement guide surface is arranged in the distal region of the latch hook facing the locking element. Here, "distal" means the region of the latch hook that first strikes the locking element at the time of engagement and is arranged distant from the connection point between the spring leg and the holding rail.

Latch hooks according to the prior art customarily have, in their distal region, in other words, in the region that first strikes the matching locking element at the time of engagement, an engagement guide surface in the form of an inclined plane with a constant angle. The matching locking element has an engagement sliding edge with a rounding with a small radius, in order to avoid force peaks or pressure peaks, when the engagement sliding edge is introduced along the guiding plane. The force that is necessary for the introduction and locking of the latch hook with the locking element is a function of the wedge angle φ (Phi) between the insertion direction and the inclined plane of the engagement guide surface, with the force becoming greater with an increasing wedge angle φ. An engagement guide surface in the form of an inclined plane with a constant angle thus has the disadvantage that with increasing deflection of the spring leg, the wedge angle φ between the insertion direction and the inclined plane increases and, as a result, the engagement force necessary for the engagement increases sharply.

In contrast, the engagement guide surface of the latch hook according to the invention has, in cross-section, a convexly curved contour. The convexly curved contour according to the invention ensures that an enlargement of the wedge angle φ as resulted with engagement guide services in the form of an inclined plane according to the prior art at the time of insertion is reduced or avoided. In other words, with convexly curved engagement guide surfaces according to the invention, the wedge angle φ, for example, remains substantially constant and independent of the deflection of the spring leg. This has the particular advantage that the cover can be locked to the holding rail precisely and without overly great expenditure of force. Alternatively, the wedge angle φ and, thus, the engagement force can be selectively influenced by a specific convex curvature of the engagement guide surface, which can be calculated by simple considerations or experiments. Thus, the curvature of the engagement guide surface can, for example, be executed such that at the beginning of the engagement procedure, a greater engagement force is necessary than toward the end of the engagement procedure. Alternatively, the curvature of the engagement guide surface can, for example, be executed such that at the beginning of the engagement procedure, a smaller engagement force is necessary than toward the end of the engagement procedure, in order to tactilely or acoustically perceive a more pronounced engagement effect.

In an advantageous embodiment of the engagement guide surface according to the invention, the convex curvature has a local radius of curvature $r_{EF}$ from 1.5*b to 5.0*b and preferably from 2.0*b to 4.0*b, where b is the maximum deflection of the latch hook during the engagement procedure. Here, "local radius of curvature" means that the convex curvature can have different radii of curvature at different points along the contour, which are, in any case, within the above indicated range. As investigations of the inventor demonstrated, local radii of curvature in this range enable simple and operationally reliable engagement under mobilization of lower engagement forces.

In an advantageous embodiment of the engagement guide surface according to the invention, the convex curvature has a constant radius of curvature $r_{EF}$ from 1.5*b to 5.0*b and preferably from 2.0*b to 4.0*b, where b is the maximum deflection of the latch hook. As investigations of the inventor demonstrated, radii of curvature in this range enable simple and operationally reliable engagement under mobilization of lower engagement forces. As a result of the constant radius of curvature, such guide surfaces are simple to design and produce.

In an advantageous embodiment of the sealing arrangement according to the invention, the engagement sliding edge has a radius of curvature $r_{EG}$ from 0.05*b to 0.5*b and preferably from 0.2*b to 0.4*b, where b is the maximum deflection of the latch hook. As investigations of the inventor demonstrated, such radii of curvature of the engagement sliding edge are particularly well-suited to prevent pressure peaks on the engagement sliding edge and the engagement guide surface and to protect their materials.

In an advantageous embodiment of the invention, a spring element is tensioned in the guide channel between a contact surface on the underside of the cover and the guide rail. The spring element is implemented, in cross-section, as a single lip, preferably finger-shaped or tongue-shaped. Together with the guide rail, the spring element seals the contact surface, preferably completely, on the underside of the cover between the positioning stop and the latching rail and supports it at the same time. The spring element preferably has high specific stiffness. The spring element seals the latching channel against the outside atmosphere. The spring element is compressed during insertion of the latching rail and pressed against the positioning stop. Together with the guide rail, the spring element centers the cover between the positioning stop and the latching rail. Centering by means of the locking arrangement made up of the spring leg and the latching rail is no longer necessary. The spring leg, relieved of the task of centering, can thus be designed particularly flexible and can thus compensate production tolerances in the region of the guide channel.

The spring element preferably includes elastomers and/or thermoplastic elastomers, preferably includes polyurethanes, polyolefins, polysulfides, polyepoxides, and rubber, such as natural rubber, nitrile rubber (NBR), styrene butadiene rubber, butadiene acrylonitrile rubber, ethylene propylene diene rubber, silicones, such as RTV-(room-temperature-vulcanizing silicone rubber), HTV-(high-temperature-vulcanizing) silicone rubber, peroxide-vulcanizing silicone rubber, and/or addition-vulcanizing silicone rubber, polyacrylates, styrene/butadiene block copolymers (SBS), and/or ethylene-propylene-diene rubber (EPDM).

The spring element is preferably implemented as a (partially) hollow body, a porous solid body, or as a solid body. The different design of the spring element enables additional variation and control of stability, weight, and elasticity.

The spring element preferably has a Shore hardness of Shore A 40 to Shore A 90, preferably Shore A 50 to Shore A 75. The Shore hardness according to the invention enables a reversible but simultaneously firm and leakproof sealing of the contact surface.

The spring element preferably has a length of 2 mm to 8 mm, preferably 3 mm to 6 mm. This length enables optimum sealing and centering of the spring element. If a greater length were selected, the supporting action can decrease; with a shorter length, the intended tolerance compensation can be partially limited. The spring element preferably has a diameter at the foot point of 0.5 mm to 3 mm, particularly preferably 1 mm to 2 mm. The "foot point" refers to the zone of the contact region of the spring element with the guide rail. The spring element preferably has a diameter on the free end of 0.2 mm to 1.5 mm, preferably from 0.5 mm to 1 mm. Particularly in combination with a Shore hardness of the spring element from Shore A 40 to Shore A 90, the dimensions mentioned improve the simultaneous supporting, sealing, and, especially, centering action of the spring element.

The holding rail and/or the guide rail preferably contain a reinforcing insert. The reinforcing insert increases the stability of the holding rail and enables further regulation of the stability. The reinforcing insert preferably includes metals, organic polymers, or composite materials.

The holding rail is preferably bonded to the pane via an adhesive bond. The adhesive bond enables a simple, stable, and durable fastening of the pane on the holding rail and through it on the mounting part. The adhesive bond preferably comprises or contains acrylate adhesives, methyl methacrylate adhesives, cyanoacrylate adhesives, polyepoxides, silicone adhesives, and/or silane-curing polymer adhesives, as well as mixtures and/or copolymers thereof. The contact surface of the adhesive bond with the pane or holding rail can, optionally, be pretreated, for example, with a primer or a plasma treatment.

The adhesive bond preferably comprises a double-sided adhesive tape. The double-sided adhesive tape enables quick and precise fixing of the pane on the holding rail. Curing of the adhesive is, as a rule, unnecessary. Dosing of the adhesive is also eliminated.

The spring leg can include a metal or plastic insert, for example, a metal foil or a metal spring. The spring leg preferably includes no metal or plastic insert and gets its flexibility from the material of the spring leg itself. Spring legs without a metal or plastic insert are particularly simple to produce.

The spring leg is preferably deflectable or deflectably connected to the holding rail. Depending on the deflection force, the connection between the mounting part and the pane can be reversibly or irreversibly locked.

The guide rail preferably has a supporting bulge, which enables design-related or tolerance-related angle deviations of, for example, plus/minus 10° between the guide rail and the latching rail. The precise dimensioning of the supporting bulge is governed by the size of the guide channel and the angle deviations provided and can be readily adapted thereto and varied as needed.

The positioning stop is preferably arranged in an angle range from 0° (parallel) to 45° relative to the latching rail. Thus, a reliable positioning of the free end of the spring element in the hollow groove formed by the underside of the cover and the positioning stop is achieved. Moreover, by means of this arrangement of the positioning stop, the sealing action of the spring element and the stability as well as the fixing on the contact surface is improved.

In an advantageous embodiment of the sealing arrangement according to the invention, the unlatching guide surface of the locking element has a first section with the contour of an inclined plane and a second section with a convexly curved contour. The convexly curved contour is preferably continued tangentially. The unlatching guide surface is arranged in the proximal region of the locking element and facing the latch hook, "proximal" here meaning facing the cover.

In an advantageous embodiment of the first section according to the invention, the latching angle γ between the inclined plane of the first section and the unlatching direction is $<\arctan(1/\mu_0)$, where $\mu_0$ is the coefficient of friction between the material of the latch hook and the material of the locking element. The maximum angle $\arctan(1/\mu_0)$ describes the self-locking angle, beyond which damage-free release of the engaged arrangement is no longer possible.

In an advantageous embodiment of the unlatching guide surface according to the invention, the latching angle γ is from 62° to 85°, depending the selection of material. Such latching angles enable reliable locking, which is secured against unintentional release. At the same time, the unlatching forces are limited by this measure such that spring legs, latch hooks, or locking element elements are not damaged at the time of unlatching.

In an advantageous embodiment of the unlatching guide surface according to the invention, the second section has a local radius of curvature $r_{AF}$ from 0.5*b to 5.0*b and preferably from 1.0*b to 3.0*b, where b is the maximum deflection of the latch hook. Here, "local radius of curvature" means that a convex curvature can have different radii of curvature that are within the above indicated range at different points along the contour. As investigations of the inventor demonstrated, local radii after in this range enable simple and operationally reliable unlatching under mobilization of lower unlatching forces.

In an advantageous embodiment of the sealing arrangement according to the invention, the second convexly curved section of the unlatching guide surface has a constant radius of curvature $r_{AF}$ from 0.5*b to 5.0*b and preferably from 1.0*b to 3.0*b, where b is the maximum deflection of the latch hook. As investigations of the inventor demonstrated, constant radii of curvature in this range enable simple and operationally reliable unlatching under mobilization of lower unlatching forces. Because of the constant radius of curvature, such unlatching guide surfaces are simple to dimension and to produce.

In an advantageous embodiment of the sealing arrangement according to the invention, the latch hook has, in the proximal region, an unlatching sliding edge that has a radius of curvature $r_{AG}$ from 0.05*b to 0.5*b and preferably from 0.2*b to 0.4*b, where b is the maximum deflection of the latch hook. As investigations of the inventor demonstrated, such radii of curvature of the unlatching sliding edge are particularly well-suited to prevent pressure peaks on the unlatching sliding edge and the unlatching guide surface and to protect their materials.

In an advantageous embodiment of the sealing arrangement according to the invention, the length of the first section in the shape of the inclined plane is from 20% to 80% of the length of the entire unlatching guide surface. The length of the second section with the convexly curved contour is then the full length of the unlatching guide surface, along which the unlatching sliding edge is guided, minus the length of the first section. The length of the first section is preferably from 40% to 60% and in particular roughly 50% of the length of the unlatching guide surface. This has the particular advantage that, on the one hand, the latch hook and the locking element are reliably locked and secured against an unintended release. On the other hand, the unlatching force increases less sharply upon reaching the second section with increasing deflection of the spring leg such that lower unlatching forces are necessary than with unlatching guide surfaces without curvature.

The invention further comprises a method for producing a sealing arrangement. In a first step, a holding rail is bonded to a pane via an adhesive bond. In a following step, a guide rail is arranged within a guide channel of a cover. In parallel or subsequently, the cover with a latching rail is pressed into a latching channel beyond a latch hook under tensioning of a spring element between the guide rail and a contact surface on the underside of the cover, with the engagement sliding edge of the locking element of the latching rail being guided along the convexly curved engagement guide surface of the latch hook. In the following step, the cover moves back under relaxation of the spring element and with the latch hook engaging on the latching rail.

Another aspect of the invention comprises a method for releasing a sealing arrangement produced according to the invention, wherein at least an unlatching sliding edge of a latch hook is guided along an inclined plane of a first section of an unlatching guide surface of the locking element and then the unlatching sliding edge is guided along a second section of the unlatching guide surface with a convexly curved contour.

The invention further comprises the use of a sealing arrangement according to the invention as a windshield or a rear window, preferably as a water box cover of a windshield.

In the following, the invention is explained in detail with reference to drawings. The drawings are a purely schematic representation and not true to scale. They in no way restrict the invention.

Figure 2:
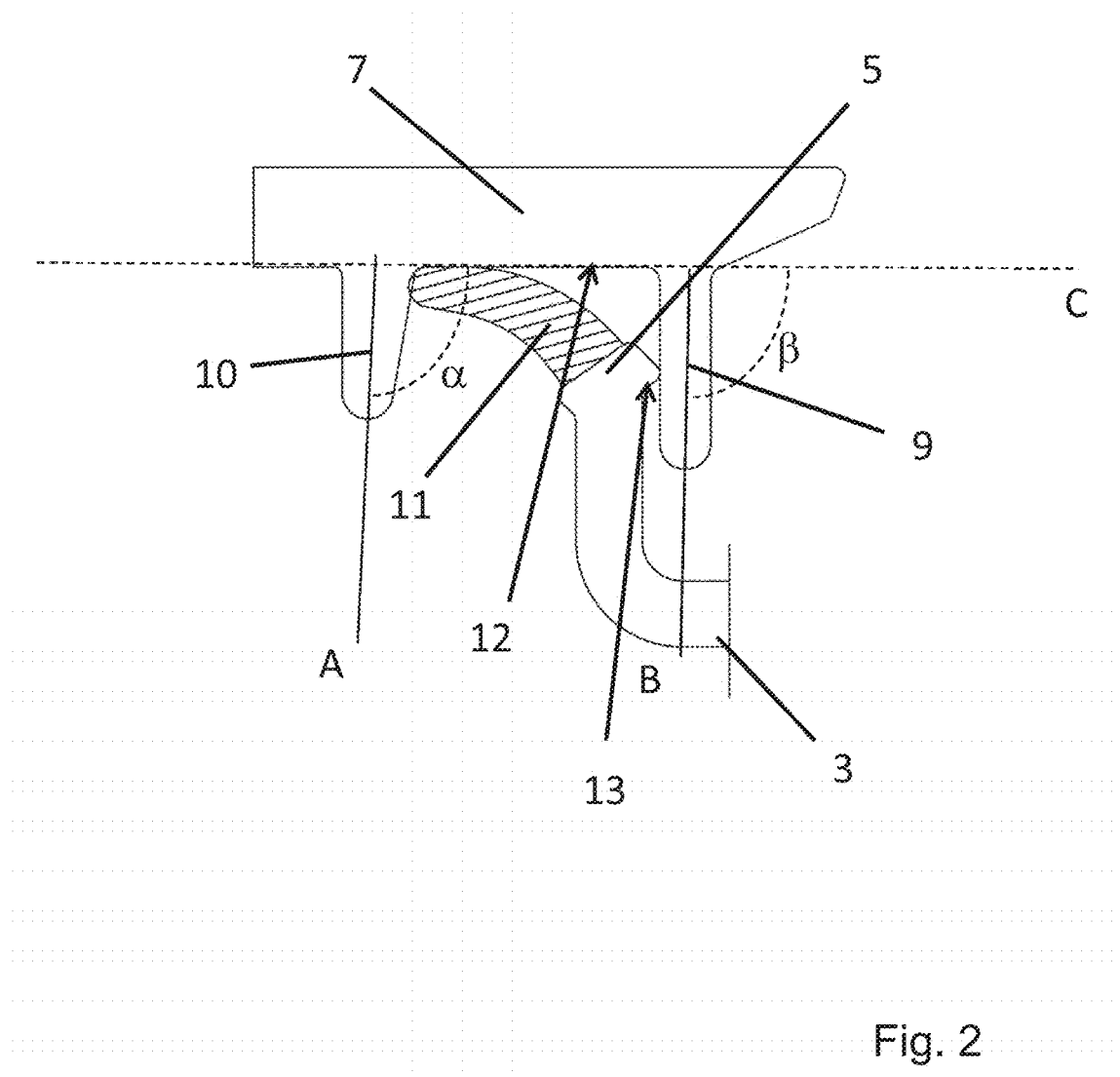
Figure 3:
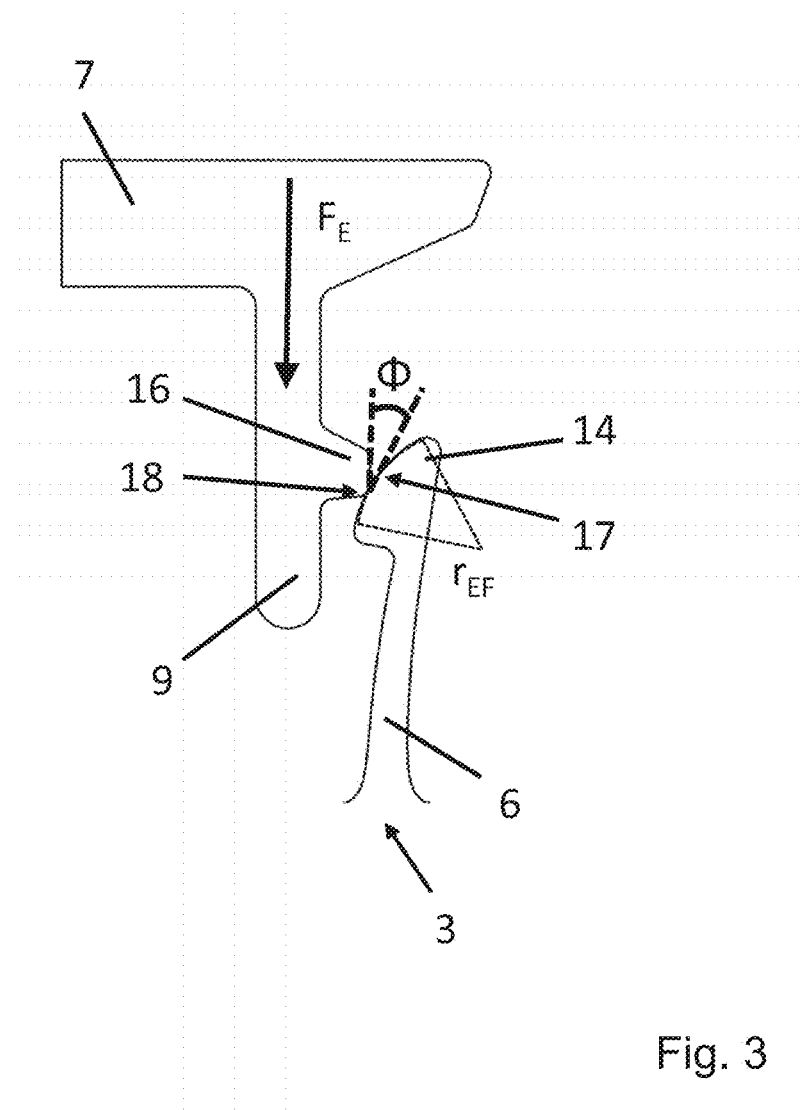
Figure 4:
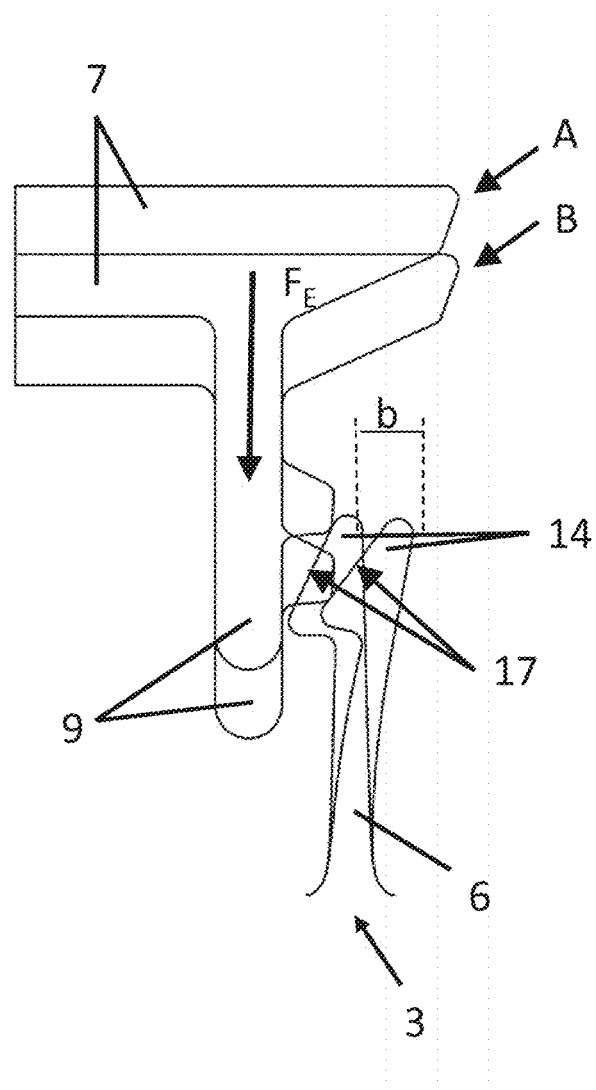
Figure 5A:
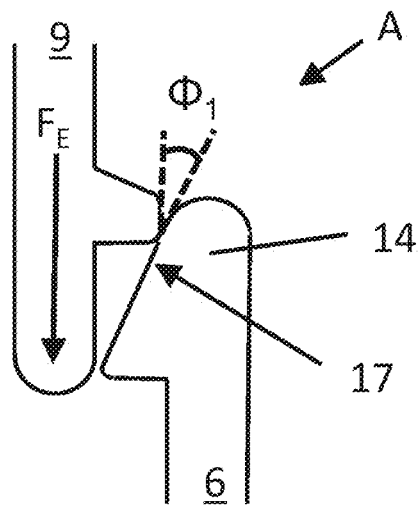
Figure 5B:
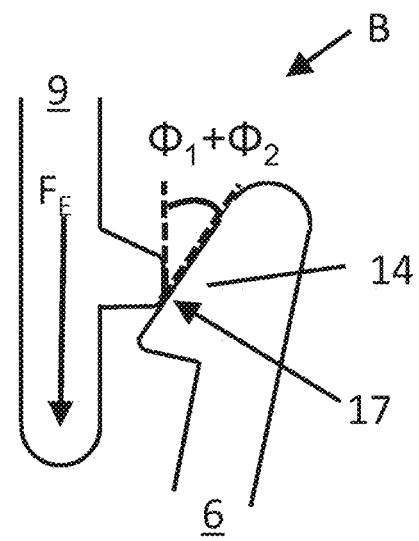
Figure 6:
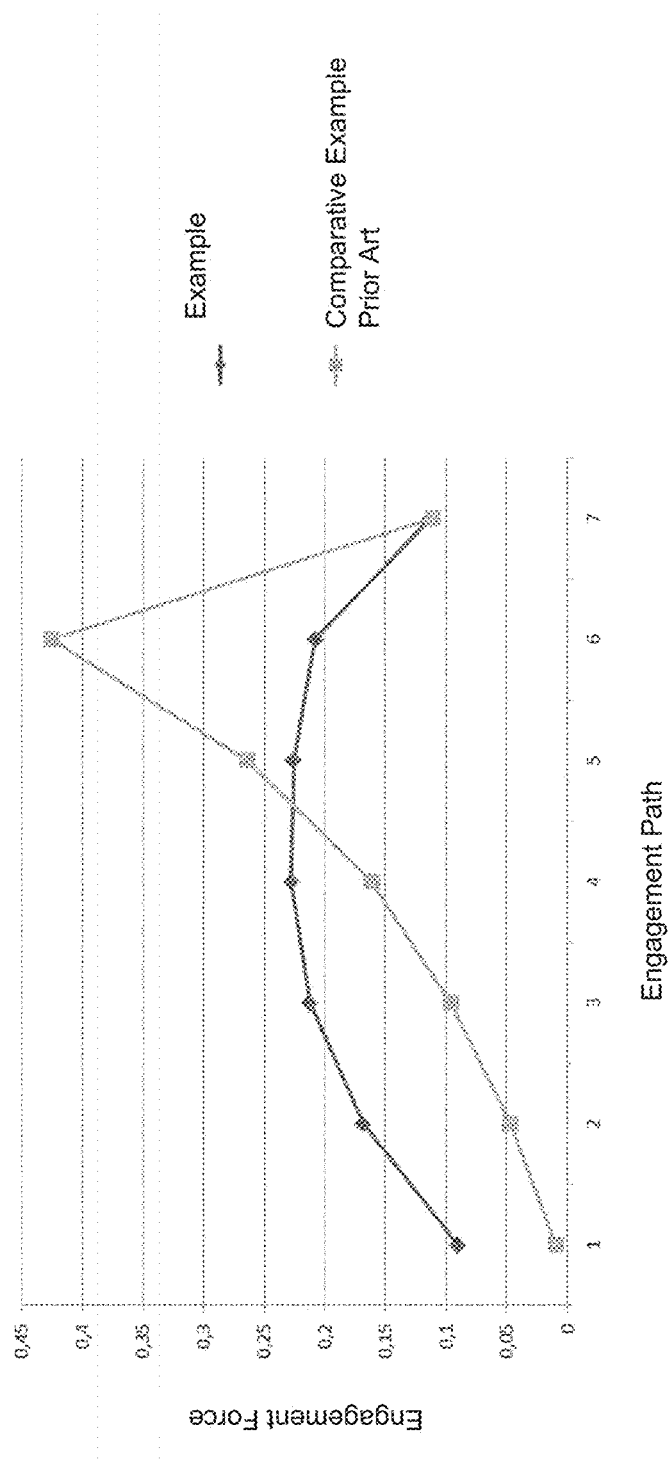
Figure 8A:
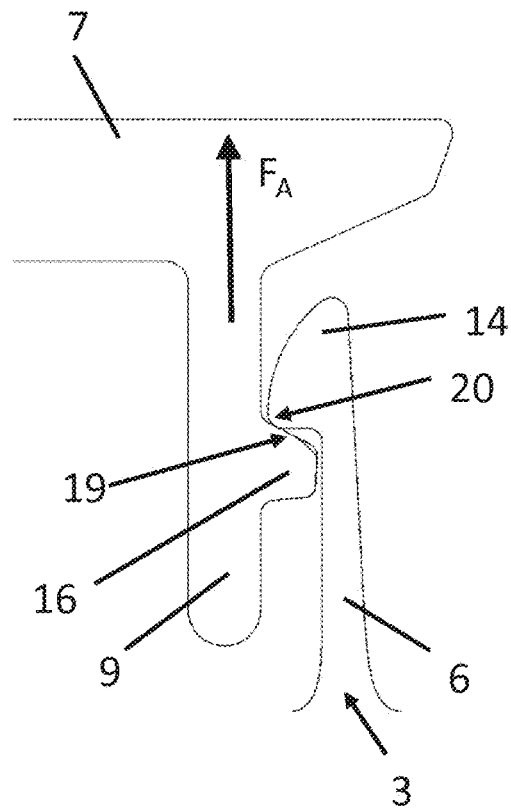
Figure 8B:
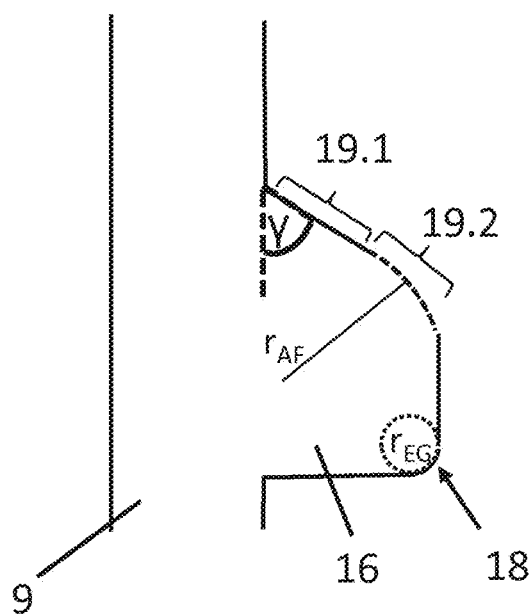
Figure 9:
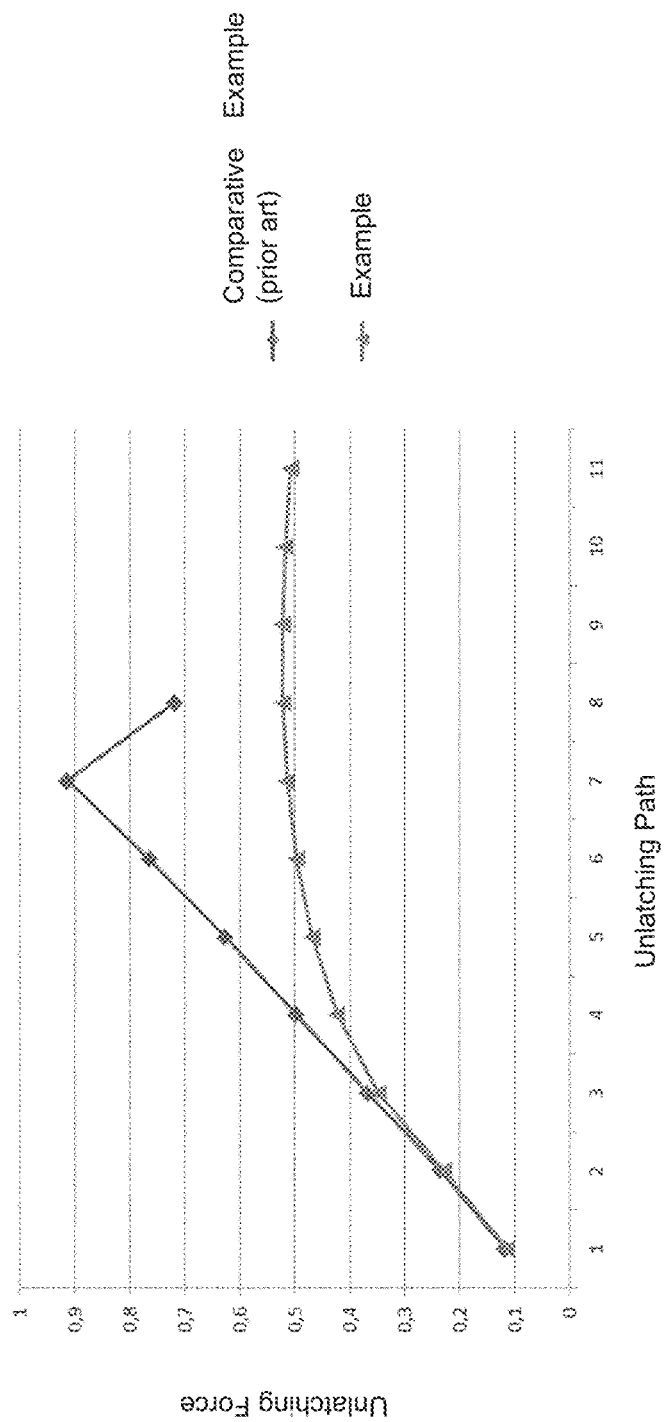

They depict:

FIG. 1 a cross-section of the sealing arrangement according to the invention,

FIG. 2 an enlarged cross-section of the locked spring element,

FIG. 3 an enlarged cross-section of the latch hook and of the locking element during engagement, FIG. 4 an enlarged cross-section of a latch hook and of a locking element according to the prior art, FIGS. 5A and 5B enlarged cross-sections of the latch hook and of the locking element according to the prior art of FIG. 4, FIG. 6 a diagram of the engagement forces during the engagement procedure, FIG. 7 a flowchart of the method according to the invention for producing the sealing arrangement, FIGS. 8A and 8B enlarged cross-sections of an alternative embodiment of the locking element according to the invention, and FIG. 9 a diagram of the engagement forces during the engagement procedure.

FIG. 1 depicts a cross-section of the sealing arrangement according to the invention. A pane 1, preferably a composite glass pane, is bonded to a holding rail 3 via an adhesive bond 2. The holding rail 3 serves for connecting a motor vehicle component, preferably a water box, to the pane 1. The holding rail 3 comprises a latching channel 4, with the latching channel 4 formed by a guide rail 5 and a spring leg 6. The holding rail 3 can, optionally, include a reinforcing insert 15. The reinforcing insert 15 preferably includes metals and elastic plastics and can also increase the stiffness of the holding rail 3. A cover 7, preferably of a water box, forms, with a latching rail 9 and a positioning stop 10, a guide channel 8. The guide rail 5 implemented as part of the holding rail 3 is arranged in the guide channel 8 and seals the guide channel 8 with a spring element 11. For clarity, reference character 11' depicts the spring element 11 in a non-tensioned state. At the same time, the latching rail 9 is engaged in the latching channel 4 on a spring leg 6 and ensures reliable fixing of the cover 7. The spring element 11, preferably in the form of a polymeric, rubber-containing, and elastic lip, is tensioned in the guide channel 8 between a contact surface 12 on the underside of the cover 7 and the guide rail 5. The spring element 11 is preferably implemented, in cross-section, as a single finger-shaped lip without additional recesses or protrusions. As described above, the spring element 11 seals, together with the guide rail 5 and preferably a supporting bulge 13, the contact surface 12 on the underside of the cover 7 between the positioning stop 10 and the latching rail 9. At the same time, the spring element 11 supports the cover 7 on the latching rail 3. The latching rail 9 and the spring leg 6 are arranged preferably parallel or substantially parallel to each other.

The locking is done by a latch hook 14 of the spring leg 6 and by a locking element 16 of the latching rail 9, for example, a locking tab, a recess, or a bulge.

The latch hook 14 has, on the side facing the latching rail 9, in the distal region, an engagement guide surface 17. Here, "distal region of the latch hook" means the region of the latch hook 14 facing away from the connection point between the spring leg 6 and the holding rail 3. The locking element 16 has, on the side facing the spring leg 6, in its distal region, an engagement sliding edge 18. Here, "distal region" of the locking element 16 means the region of the locking element 16 facing away from the connection point between the latching rail 9 and the cover 7.

The positioning stop 10 and the latching rail 9 are arranged preferably parallel or with a slight opening angle relative to each other. This arrangement enables, together with the spring element 11 and the supporting bulge 13 on the guide rail 5, a leakproof closure of the latching channel 4 and of the intermediate space between the cover 7, the latching rail 3, and the pane 1.

FIG. 2 depicts an enlarged cross-section of the locked spring element. The region of the cover 7 depicted includes the positioning stop 10 and the latching rail 9. The contact surface 12 is formed by the intermediate space between the positioning stop 10 and the latching rail 9. The positioning stop 10 and the latching rail 9 are arranged preferably parallel or in a V shape relative to each other. In the context of the invention, "V-shaped" also includes an averaged angular deviation between contact surface 12 and the imaginary averaged straight lines A and B through the positioning stop 10 and the latching rail of as much as 45°. Preferred here is an arrangement of the straight lines A and B opening away from the contact surface 12. The angle α (alpha) between the plane C of the contact surface 12 and the straight line A is, consequently, preferably from 90° to 135°; the angle β (beta) between the plane C of the contact surface 12 and the straight line B is preferably from 60° to 90°. The spring element 11 is implemented, in cross-section, preferably finger-shaped or tongue-shaped and seals, together with the guide rail 5 and the supporting bulge 13, the contact surface 12 and the space on the right (not shown in the figure) between the cover 7 and the pane 1 (not shown). At the same time, the spring element 11 preferably has a Shore hardness from Shore A 50 to Shore A 75 as well as a length of 3 mm to 6 mm. The spring element compressed in the installed state presses against the positioning stop 10 and the latching rail 9 and thus enables centering without actual locking. In addition, the spring element 6 is flexible enough that it can compensate production tolerances in the guide channel 8.

FIG. 3 depicts the basic contour of a spring leg 6 with a latch hook 14 and the latching rail 9 with the locking element 16 of FIG. 1 during the engagement procedure in an enlarged cross-sectional representation.

The latch hook 14 has, on the side facing the rail 9, in the distal region, an engagement guide surface 17. The engagement guide surface 17 is convexly curved. Here, the engagement guide surface 17 has, for example, the shape of a circular segment with a radius of curvature of the engagement guide surface $r_{EF}$ of 2 mm. The locking element 16 has, on the side facing the spring leg 6, in its distal region, an engagement sliding edge 18.

The engagement sliding edge 18 has here, for example, the shape of a circular segment with a radius of curvature of the engagement sliding edge $r_{EG}$ of 0.15 mm. In this example, the maximum deviation b of the latch hook 14 is 0.7 mm, which corresponds here substantially to the width of the locking element 16.

During the engagement procedure, an engagement force $F_E$ is exerted on the cover. The engagement sliding edge 18 strikes the tangent of the engagement guide surface 17 of the latch hook 14 at a wedge angle φ (phi). The engagement force $F_E$ strikes the latch hook 14 at the contact point between the engagement sliding edge 18 and the engagement guide surface 17 and is converted into a transverse force such that the latch hook 14 is moved away from the latching rail 9 by the transverse force under tensioning of the spring leg 6. The engagement force $F_E$ necessary depends on the restoring force of the spring leg 6, the friction between the engagement guide surface 17 and the engagement sliding edge 18, and, in particular, on the wedge angle φ between the direction of the engagement force $F_E$ and the tangent to the engagement guide surface 17.

FIG. 4 depicts an enlarged cross-section of a latch hook 14 and of a locking element 16 according to the prior art during an engagement procedure. FIGS. 5A and 5B again depict enlarged cross-sections of the latch hook 14 and of the locking element 16 according to the prior art of FIG. 4.

The latch hook 14 according to the prior art has, on its distal side, in other words, on its side facing away from the connection point of the spring leg 6 and the holding rail 3, an engagement guide surface 17 in the form of an inclined plane. Moreover, the locking element 16 has, on its distal end, an engagement sliding edge 18.

FIG. 5A depicts a first engagement position A, in which the engagement sliding edge 18 strikes the engagement guide surface 17. The engagement force $F_E$ strikes the engagement sliding edge 18 at the wedge angle $\phi_1$ on the inclined plane of the engagement guide surface 17. There, the engagement force $F_E$ is converted into a transverse force, which deflects the latch hook 14, under tensioning of the spring leg 6, from the latching rail 9.

With further engagement, the engagement sliding edge 18 slides along the engagement guide surface 17, with the spring leg 6 being further tensioned. By means of the deflection of the latch hook 14 and by means of the firm tensioning of the spring leg 6 at the connection point to the holding rail 3, the inclined plane of the engagement guide surface 17 is further inclined relative to the direction of the engagement force $F_E$.

FIG. 5B depicts a second, later engagement position B. The wedge angle $\phi_1$ between the insertion direction and the inclined plane of the guide surface 17 has increased by the angle $\phi_2$. The engagement force $F_E$ that is necessary for inserting and locking the latch hook 14 into the locking element 16 is a function of the wedge angle $\phi$ between the insertion direction and the inclined plane of the guide surface 17, with the engagement force $F_E$ becoming greater with an increasing wedge angle $\phi$.

An engagement guide surface 17 according to the prior art in the form of an inclined plane thus has the disadvantage that with increasing deflection of the spring leg, the wedge angle $\phi$ between the engagement force $F_E$ and the inclined plane increases and, as a result, the engagement force $F_E$ necessary for the insertion increases greatly.

In contrast, the engagement guide surface 17 according to the invention has, in cross-section, a convexly curved contour, as is depicted in FIG. 3. The convexly curved engagement guide surface 17 according to the invention has the effect of reducing or preventing enlargement of the wedge angle $\phi$ as it occurs with engagement guide surfaces 17 in the form of an inclined plane according to the prior art at the time of insertion. In other words, with convexly curved engagement guide surfaces 17 according to the invention, the wedge angle $\phi$ remains substantially constant and independent of the deflection of the spring leg 6.

For better clarity, FIG. 6 depicts a diagram of the engagement forces $F_E$ during the engagement procedure. In each case, the engagement force $F_E$ is plotted over the engagement path in arbitrary units. The engagement path is the approach of the cover 7 to the holding rail 3. Only the change in the wedge angle $\phi$ through the deflection of the spring leg 6 is taken into account. Other influences, such as friction, are ignored.

As a comparative example, the engagement force $F_E$ of a latch hook 14 according to the prior art of FIG. 4 with an engagement guide surface 17 in the form of an inclined plane is plotted. The engagement force $F_E$ increases progressively to a maximum value as the engagement path increases.

As an example according to the invention, the engagement force $F_E$ of a latch hook 14 of FIG. 1 with a convexly curved engagement guide surface 17 according to the invention is depicted. Compared to the prior art, the engagement force $F_E$ increases more slowly. The maximum value of the engagement force $F_E$ is only roughly 50% of the maximum value of the comparative example. This result was unexpected and surprising for the person skilled in the art.

FIG. 7 depicts a flowchart of the method according to the invention for producing the sealing arrangement. In a first step, a holding rail 3 is bonded to a pane 1 via an adhesive bond 2 in the form of a double-sided adhesive tape. In a following step, a guide rail 5 is arranged within a guide channel 8 between a positioning stop 10 and a latching rail 9 of a cover 7. Then, the cover 7 is pressed with a latching rail 9 into a latching channel 4 beyond a latch hook 14 under tensioning of a spring element 11 between the guide rail 5 and a contact surface 12 on the underside of the cover 7. In the final step, the cover 7 moves back under relaxation of the spring element 11 and, in the process, the latch hook 14 is engaged on the locking element 16 of the latching rail 9.

FIG. 8A depicts an enlarged cross-section of an alternative embodiment of the locking element according to the invention 16 with latch hook 14 in the locked state. The latch hook 14 is leaned with its unlatching sliding edge 20 against the unlatching guide surface 19, preferably at the starting edge, at which the locking element 16 borders the latching rail 9. The spring leg 6 is preferably relaxed or only slightly deflected.

FIG. 8B depicts an enlarged cross-section of the locking element 16 of FIG. 8A. The unlatching guide surface 19 is divided into two sections: The first section 19.1 begins at the starting edge with which the locking element 16 adjoins the latching rail 9 and has an inclined plane with a latching angle $\gamma$ of, for example, 65°. A second section 19.2 in the form of a convexly curved surface is tangentially connected to the first section 19.2. This convexly curved section 19.2 of the unlatching guide surface 19 has, for example, a constant radius of curvature $r_{AF}$ of 2 mm. Also shown in detail is the engagement sliding edge 18 with a radius of curvature $r_{EG}$ of 0.15 mm.

So that no self locking occurs at the time of unlatching of the latch hook 14, with a given coefficient of friction $\mu_o$, the latching angle $\gamma$ must be designed such that $\gamma < \arctan(1/\mu_o)$. The latching angle $\gamma$ in the locked position alone determines the securing of the latched position.

At the time of the unlatching procedure, the unlatching sliding edge 20 slides along the unlatching guide surface 19 and, initially, along the first section 19.1. Since the unlatching guide surface 19 is arranged on the locking element 16 of the rigid latching rail 9, the wedge angle $\phi$ does not change. However, the unlatching force $F_A$ increases linearly with the deflection of the spring leg 6 to high forces, with the risk of overloading the latch hook 14 or the locking element 16 occurring.

FIG. 9 depicts a diagram of the unlatching force $F_A$ plotted over the unlatching path. The comparative example according to the prior art is an unlatching guide surface 19, which consists of a single section in the form of an inclined plane with a fixed locking angle $\gamma$. The example is an unlatching guide surface 19 according to the invention, which consists of a first section 19.1 with the shape of an inclined plane and a second section 19.2 in the form of a circular segment.

At the time of the unlatching procedure, both in the comparative example according to the prior art and in the example according to the invention, the unlatching force $F_A$ increases roughly linearly, since in both cases the unlatching sliding edge 20 of the latch hook 14 slides along an inclined plane of section 19.1, linear in its cross-section, of the unlatching guide surface 19. The linear increase is initially advantageous and desirable in order to ensure a high unlatching threshold and, thus, reliable locking that is protected against unintended unlatching.

In the comparative example according to the prior art, the unlatching force $F_A$ rises all the way to very high values, resulting in the risk of damage to the latch hook 14 or to the locking element 16.

In the example according to the invention, the unlatching sliding edge 20 slides over the second section 19.2 of the unlatching guide surface 19, which has a convex curvature. By means of the convex curvature, the wedge angle $\phi$ is reduced and compensates the increase in the unlatching force $F_A$ that is caused by the increasing deflection of the spring leg 6. As FIG. 9 depicts, the slope of the unlatching force $F_A$ in the Example 2 according to the invention decreases and reaches only roughly 50% of the maximum value of the comparative example according to the prior art.

This was unexpected and surprising for the person skilled in the art.

LIST OF REFERENCE CHARACTERS 1 pane
2 adhesive bond
3 holding rail
4 latching channel
5 guide rail
6 spring leg
7 cover
8 guide channel
9 latching rail
10 positioning stop
11 spring element
12 contact surface
13 supporting bulge
14 latch hook
15 reinforcing insert
16 locking element, recesses or bulges
17 engagement guide surface
18 engagement sliding edge
19 unlatching guide surface
19.1 first section of the unlatching guide surface 19
19.2 second section of the unlatching guide surface 19
20 unlatching slide edge
A, B straight line
b maximum deflection of the latch hook 14
$F_A$ unlatching force
$F_E$ engagement force
$r_{AF}$ radius of curvature of the unlatching guide surface 19
$r_{AG}$ radius of curvature of the unlatching sliding edge 20
$r_{EF}$ radius of curvature of the engagement guide surface 17
$r_{EG}$ radius of curvature of the engagement sliding edge 18
$\alpha$, $\beta$ angle
$\gamma$ latching angle
$\phi$, $\phi_1$, $\phi_2$ wedge angle
$\mu_0$ coefficient of friction between the latch hook 14 and the locking element 16

The invention claimed is:
1. A sealing arrangement for a motor vehicle window pane, comprising:
a holding rail having a latching channel that is formed by a guide rail and a spring leg with a latch hook, wherein the holding rail is affixed on a window pane; and
a cover having a guide channel that is formed by a positioning stop and a latching rail having a locking element,
wherein the guide rail is arranged in the guide channel, and the latching rail is arranged in the latching channel,
wherein the latch hook is latched onto the locking element, such that a convexly curved engagement guide surface of the latch hook is guided along an engagement sliding edge of the locking element,
wherein a spring element is tensioned in the guide channel between a contact surface on the underside of the cover and the guide rail, and
wherein the convexly curved engagement guide surface has a local radius of curvature $r_{EF}$ of 1.5*b to 5.0*b, where b is a maximum deflection of the latch hook.

2. The sealing arrangement according to claim 1, wherein the convexly curved engagement guide surface is arranged in a distal region of the latch hook facing the locking element.

3. The sealing arrangement according to claim 1, wherein the convexly curved engagement guide surface has a local radius of curvature $r_{EF}$ of 2.0*b to 4.0*b.

4. The sealing arrangement according to claim 1, wherein the local radius of curvature of the convexly curved engagement guide surface is constant.

5. The sealing arrangement according to claim 1, wherein the spring element is implemented, in cross-section, as a single lip and, together with the guide rail, seals and supports the contact surface on the underside of the cover between the positioning stop and the latching rail.

6. The sealing arrangement according to claim 1, wherein the engagement sliding edge has a radius of curvature $r_{EG}$ of 0.05*b to 0.5*b.

7. The sealing arrangement according to claim 6, wherein the engagement sliding edge has a radius of curvature $r_{EG}$ of 0.2*b to 0.4*b.

8. The sealing arrangement according to claim 1, wherein the spring leg is deflectable.

9. The sealing arrangement according to claim 8, wherein the spring leg is deflectably connected to the holding rail and the latching rail is rigid.

10. The sealing arrangement according to claim 1, wherein the locking element includes an unlatching guide surface with a first section with the contour of an inclined plane and a second section with a convexly curved contour.

11. The sealing arrangement according to claim 10, wherein a latching angle $\gamma$ between the first section and a release direction is less than $\arctan(1/\mu_0)$, where $\mu_0$ is the coefficient of friction between the latch hook and the locking element.

12. The sealing arrangement according to claim 11, wherein the latching angle $\gamma$ is from 62° to 85°.

13. The sealing arrangement according to claim 10, wherein the second section has a local radius of curvature $r_{AF}$ of 0.5*b to 5.0*b.

14. The sealing arrangement according to claim 13, wherein the second section has a local radius of curvature $r_{AF}$ of 1.0*b to 3.0*b.

15. The sealing arrangement according to claim 10, wherein the second section has a constant radius of curvature $r_{AF}$ of 0.5*b to 5.0*b.

16. The sealing arrangement according to claim 15, wherein the second section has a constant radius of curvature $r_{AF}$ of 1.0*b to 3.0*b.

17. The sealing arrangement according to claim 10, wherein the length of the first section is from 20% to 80% of the length of the unlatching guide surface.

18. The sealing arrangement according to claim 17, wherein the length of the first section is from 40% to 60% of the length of the unlatching guide surface.

19. A method for producing a sealing arrangement, comprising:
bonding a holding rail to a pane via an adhesive bond;
arranging a guide rail within a guide channel of a cover;
pressing the cover having a latching rail into a latching channel beyond a latch hook under tensioning of a spring element between the guide rail and a contact surface on an underside of the cover, such that an engagement sliding edge of a locking element of the latching rail is guided along a convexly curved engagement guide surface of the latch hook; and
relaxing the spring element so that that latching latch hook is engaged on the locking element of the latching rail.

20. A method for releasing the sealing arrangement produced according to claim 19, comprising guiding an unlatching sliding edge of the latch hook along an inclined plane of a first section of an unlatching guide surface of the locking element, wherein the unlatching sliding edge is guided along a convexly curved contour of a second section of the unlatching guide surface.

21. A method of using of the sealing arrangement produced according to claim 10, wherein the pane is a windshield or rear window.

22. A method of using of the sealing arrangement produced according to claim 10, wherein the pane is a windshield, and wherein the cover is configured as a water box.

* * * * *